July 13, 1965    O. H. FEHLBERG    3,194,100
CONVEYORS FOR FEEDING WORKPIECES TO A CUTOFF TOOL
Filed Oct. 16, 1961    5 Sheets-Sheet 4
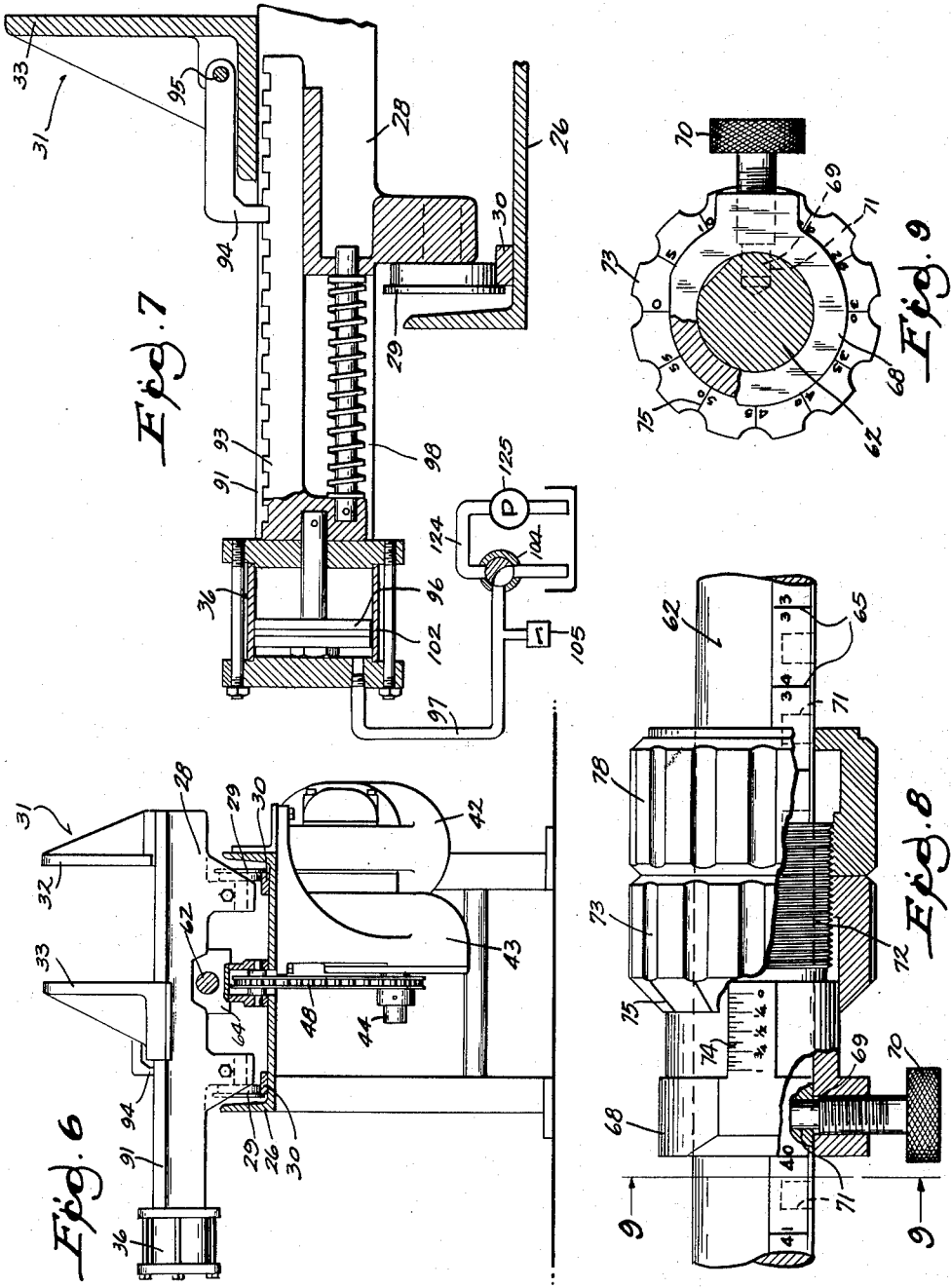
INVENTOR.
OTTO H. FEHLBERG, JR
BY
Wheeler, Wheeler + Wheeler
ATTORNEYS

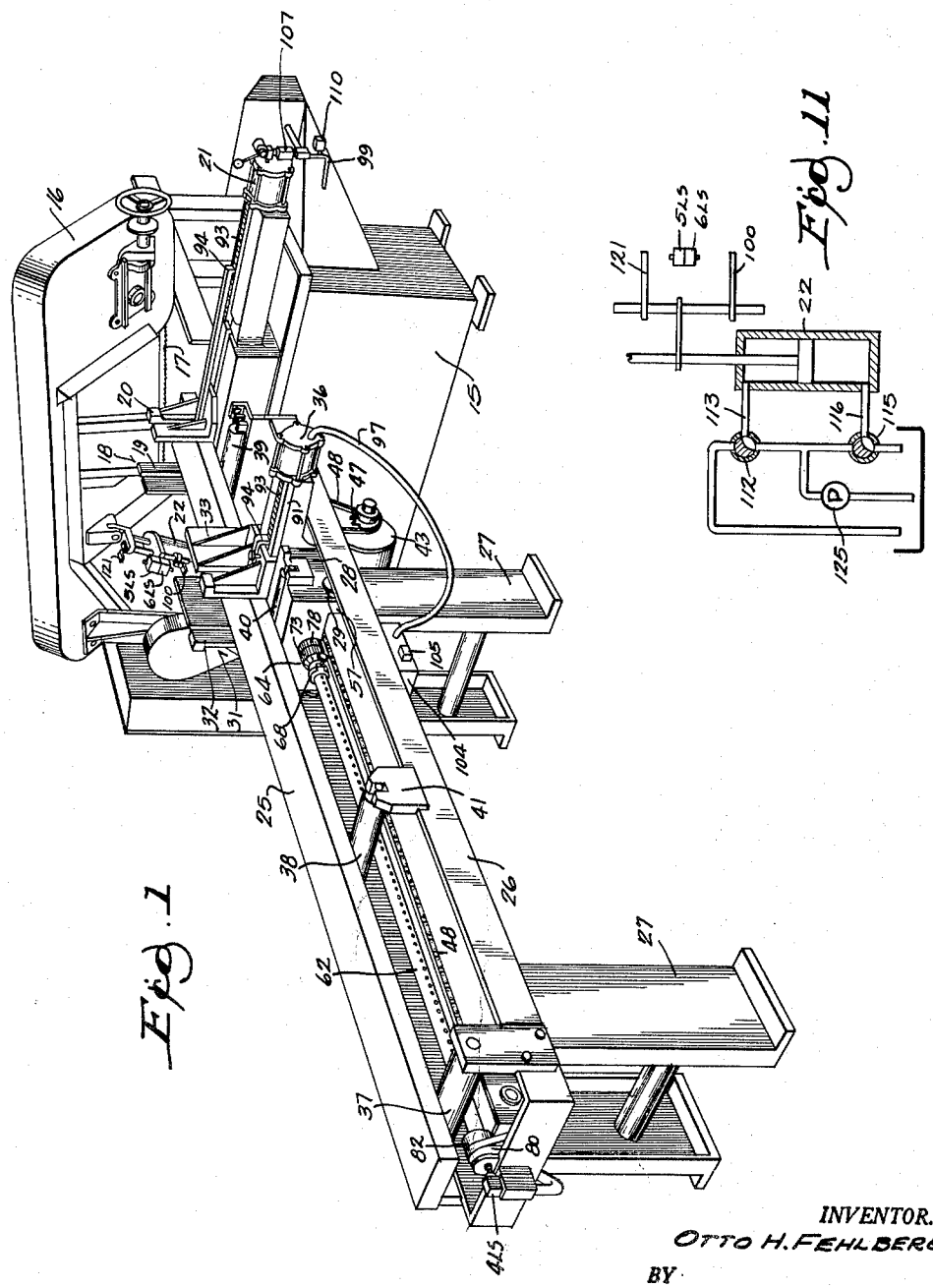

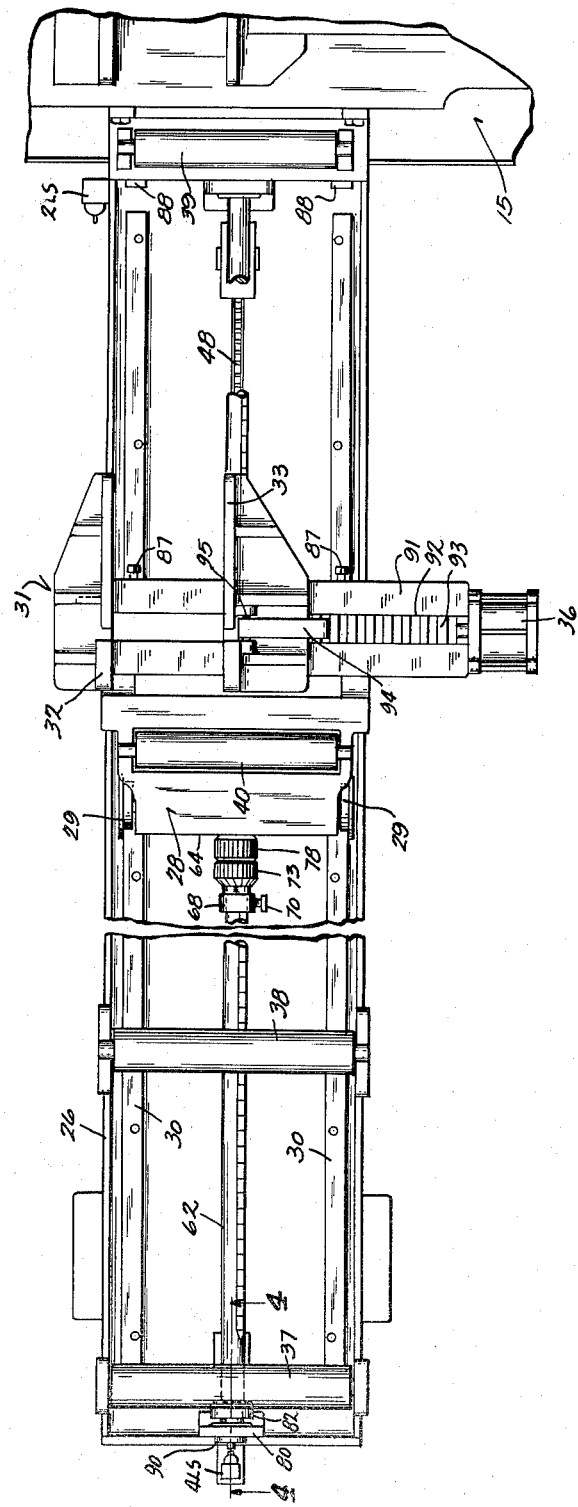

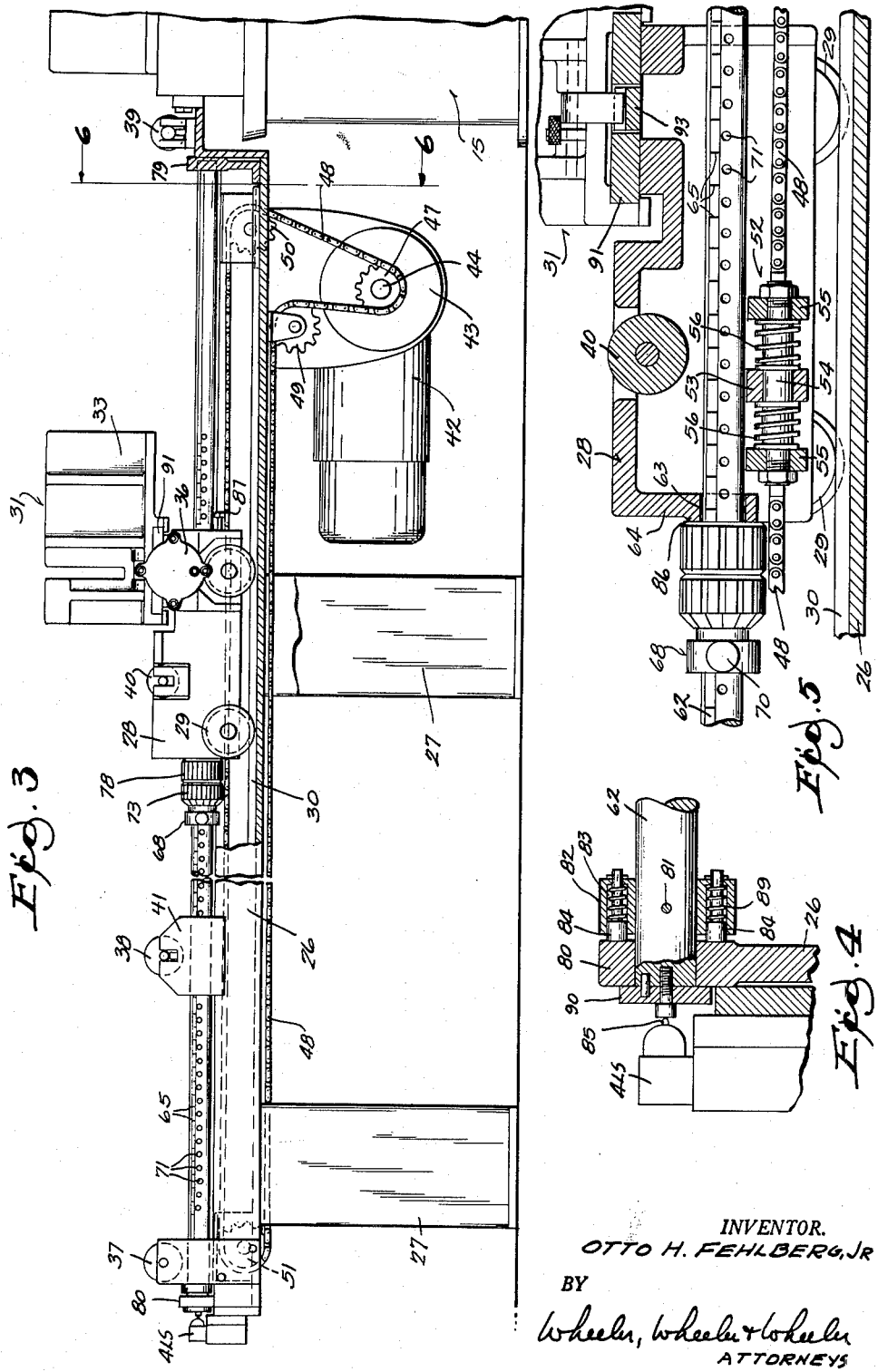

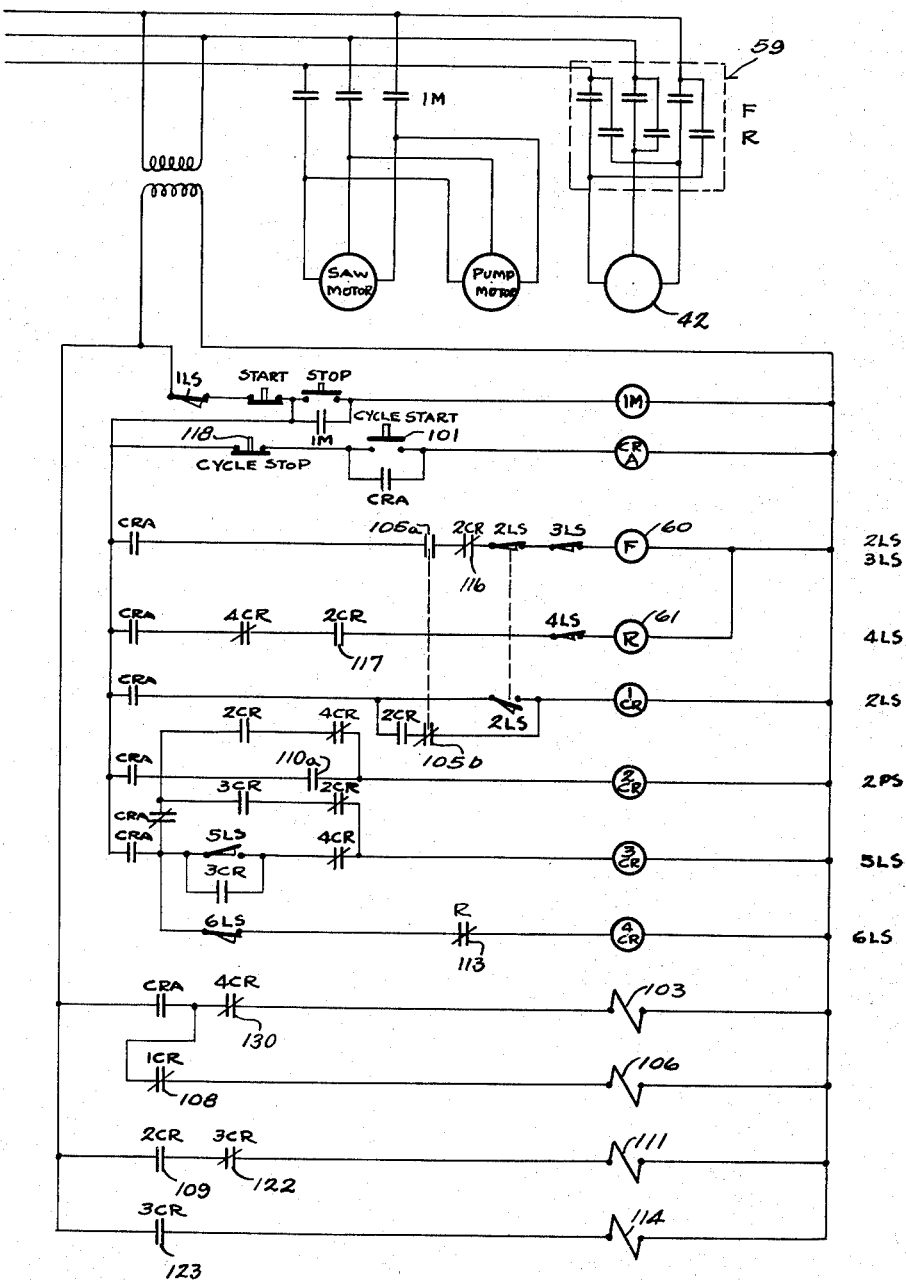

United States Patent Office 3,194,100
Patented July 13, 1965

3,194,100
CONVEYORS FOR FEEDING WORKPIECES TO A CUTOFF TOOL
Otto H. Fehlberg, Racine, Wis., assignor to Peerless Machine Company, Oshkosh, Wis., a corporation of Delaware
Filed Oct. 16, 1961, Ser. No. 145,315
4 Claims. (Cl. 83—247)

This invention relates to improvements in conveyors for feeding workpieces to a cutoff tool.

While not limited thereto, the invention is disclosed herein in connection with a metalworking band saw embodiment.

Apparatus embodying the present invention is entirely automatic and cycles continuously to feed a workpiece to the cutoff tool in progressive increments, the length of which is accurately gauged so that the tool will repeatedly cut off equal lengths of the workpiece.

An important feature of the present invention is the length gauging mechanism by which extreme accuracy in the length of cut is achieved. This accuracy is achieved in the disclosed embodiment in large measure because of the positive stops between which the conveyor operates in its shuttling stroke.

Another important feature of the invention and which contributes to the accuracy of the saw cut is the interlock between the fixed vise and the movable vise of the shuttle stroke conveyor. The interlock is such that one vise will not release the workpiece until the other vise has clamped the workpiece. Accordingly, one or the other of the vises is always positively engaged with the workpiece. This avoids any chance of slippage or unwanted movement of the workpiece with respect to the conveyor.

In the preferred embodiment, the interlock aforesaid is achieved in the hydraulic and electric circuits by which the respective vises are clamped and unclamped. One vise will not release the workpiece until the pressure in the hydraulic motor of the other vise has built up to a level at which the workpiece is securely clamped, whereupon a pressure responsive switch is actuated to initiate release of the other vise.

Other objects, features and advantages of the invention will appear from the following disclosure in which:

FIG. 1 is a perspective view of a metalworking band saw machine with a shuttle stroke conveyor embodying the present invention.

FIG. 2 is a plan view of the conveyor table portion of the machine shown in FIG. 1.

FIG. 3 is a side elevation, partly in longitudinal cross section, of the conveyor table portion of the machine shown in FIG. 2.

FIG. 4 is a fragmentary axial cross section taken along the line 4—4 of FIG. 2.

FIG. 5 is an enlarged fragmentary longitudinal cross section taken through the movable carriage of the shuttle stroke conveyor.

FIG. 6 is a fragmentary cross section taken along the line 6—6 of FIG. 3.

FIG. 7 is a greatly enlarged cross section taken through the movable vise jaw of the movable vise shown in FIG. 6. Details of the hydraulic motor and spring return are shown in section. Portions of the hydraulic circuit are shown diagrammatically.

FIG. 8 is an enlarged fragmentary view, partly in cross section, of a portion of the gauge rod and the micrometer stop thereon.

FIG. 9 is a cross section taken along the line 9—9 of FIG. 8.

FIG. 10 is a simplified electrical circuit diagram for the hydraulic and electrical components of the machine.

FIG. 11 is a simplified hydraulic circuit diagram for the double-acting saw frame fluid motor.

The workpiece cutoff portion of the machine is generally conventional and includes a base 15 which supports the overhanging band saw arm or frame 16 for the band saw blade 17. The base 15 is provided with a fixed vise 18 which has a fixed jaw 19 and a movable jaw 20. Jaw 20 is actuated under the pressure of fluid motor 21, as will hereinafter be explained in more detail.

The band saw blade 17 is driven by an electric motor labeled "saw motor" in FIG. 10 and the frame 16 is raised and lowered under control of the double-acting hydraulic motor 22. On the downstroke of motor 22, blade 17 is advanced in a cutting stroke through the workpiece 25. On its upstroke, motor 22 lifts the blade after the cutting stroke has been completed. After the frame is elevated, the workpiece is advanced to its next succeeding position in readiness for the next cutting stroke.

Projecting at one side of the base 15 is an elongated conveyor table 26 supported on legs 27. Table 26 is part of a shuttle stroke conveyor which automatically feeds the workpiece 25 in progressive increments to the cutoff saw 17. Workpiece 25 as illustrated is a metal bar. The machine is adapted to operate upon bars, channels, beams, rods, etc.

In the disclosed embodiment of the invention, there is a movable workpiece carriage 28 having wheels 29 which run on tracks 30 supported on the table 26. Carriage 28 supports movable vise 31, which has a fixed jaw 32 and a movable jaw 33. Movable jaw 33 is power operated by the fluid motor 36, as will hereinafter be explained in more detail.

Table 26 is provided at spaced intervals with support rollers 37, 38, 39 for the elongated workpiece 25. Carriage 28 is also provided with a similar support roller 40. The respective rollers 37, 38, 39, 40 are disposed at the same level and support the workpiece 25 for endwise movement longitudinally of the table 26 and for alternate engagement by the respective vises 18, 31.

The respective end support rollers 37, 39 have fixed positions above the table 26, but intermediate support roller 38 can be adjusted longitudinally of the table, its end bearing blocks 41 being rabbeted for sliding engagement with the side walls of the table 26. Where the shuttle stroke conveyor has a long stroke, intermediate roller 38 and its bearing blocks 41 may be removed entirely from the table so as not to interfere with movement of the carriage 28.

Carriage 28 is driven by electric motor 42 through a speed reducing gear head 43, the output shaft 44 of which is provided with a sprocket 47 in meshing engagement with a chain 48 which is trained around suitable guide sprockets 49, 50, 51 and has its respective ends connected to the carriage 28 through a strain relief coupling 52. In this specification, the term "chain" applies also to any like flexible motion transmitting connection. As best shown in FIG. 5, strain relief coupling 52 includes a central lug 53 fixed to the carriage 28. Lug 53 has a central opening which receives an axially slidable stem 54. Stem 54 has end collars 55 spaced axially from and at either side of the lug 53. Confined between the respective collars 55 and the central lug 53 are helical springs 56 wound about the stem 54. Accordingly, the pressure of chain 48 is transmitted to the carriage 28 through the springs 56 which may yield on sudden stoppage of the carriage to relieve the chain and carriage of undue stopping shocks.

The direction of rotation of the motor 42 is controlled by the reversing switchgear 59 shown diagrammatically in FIG. 10 and by the forward and reverse relays 60, 61, which are subject respectively to limit switch 2LS mounted at the head end of the table 26 and limit switch 4LS mounted on the tail end of the table 26. The sequence of operation of these electrical components will be described in connection with the explanation of FIG. 10.

Also extending longitudinally along the table 26 is a gauge rod 62 straddled by the legs 57 of the carriage 28. The carriage has a depending lug 64 formed out of its front wall and having an opening 63 about the rod 62.

Gauge rod 62 is provided with graduations 65, desirably scaled in terms of linear measurement such as inches. Slidable along the gauge rod 62 is a micrometer collar 68 which has a locking stem or dog 69 radially adjustable by the thumb nut 70 and adapted to be selectively engaged in any one of the sockets 71 with which the rod 62 is provided. Sockets 71 are spaced along the rod to correspond to the graduations 65.

Collar 68 is further provided with a threaded sleeve 72 on which a micrometer nut 73 is threaded. The collar 68 is provided with a scale 74 which cooperates with the micrometer graduations 75 on the bevel face of the nut 73. There is also a lock nut 78 which will lock the micrometer nut 74 in any position in which it is adjusted on its thread 72.

The gauge mechanism aforedescribed determines the length of the feed of the workpiece 25 for each forward stroke of the shuttle carriage 28. The adjustment is such that successive saw cuts can be accurately spaced anywhere in the range from 1/8 inch to 72 inches.

At the head end of the table 26, the gauge rod 62 is supported for slight axial movement in a bearing socket 79. At the tail end of the table, rod 62 is supported for slight axial movement in a bearing socket 80. As best shown in FIG. 4, the gauge rod is connected by cross pin 81 to a collar 82 which has sockets 83 aligned telescopically with posts 84 on the fixed abutment 80 which functions both as a sliding bearing for the rod and as a positive stop for the rod through collar 82 after slight lost motion between the rod and abutment 80.

Axially aligned with the gauge rod 62 is limit switch 4LS, which has an actuating button 85, which is engaged by actuating pad 90 on the end of rod 62 when stop collar 82 on gauge rod 62 abuts the positive stop 80. As shown in FIG. 10, actuation of limit switch 4LS deenergizes relay 61 to deenergize motor 42.

To adjust the stroke of the shuttle type conveyor, the micrometer mechanism shown in FIG. 8 is set for the desired feed of the workpiece 25. As shown by the graduations illustrated in FIGS. 8 and 9, the micrometer is set to advance the workpiece 40¼ inches in each cycle of the machine. As the carriage 28 moves toward the tail end of the machine in its retractive movement along the relatively fixed gauge rod 62, its accurately machined abutment pad 86 on lug 64 will strike the stop nut 78. The carriage will then pick up the rod 62 and will move it longitudinally on its own axis a lost motion distance equal to the slight spacing between the stop collar 82 and the positive stop 80. Within the slight spacing or lost motion aforesaid, switch button 85 will be depressed to actuate limit switch 4LS and deenergize motor 42.

The abutment of the collar 82 with the positive stop 80 will establish the extreme retrograde position of the carriage 28 for any setting of the micrometer along the gauge rod 62. The strain relief mechanism 52 will permit the carriage 28 to come to a dead stop without unduly stressing the chain 48 on carriage 28. On reversal of the motor 42, the carriage 28 will drive forwardly along the table until its stop bolts 87 (FIGS. 2 and 3) abut the positive stop pads 88 on the machine frame (see FIG. 2). These establish the extreme forward position of the carriage 28. Concurrently the carriage will actuate limit switch 2LS to deenergize the motor 42 and thereafter actuate the reversing switchgear 59 through the forward relay 60.

From the foregoing, it is clear that the carriage 28 will reciprocate along the table 26 a distance determined by the setting of the gauge mechanism shown in FIG. 8. At the end of each retrograde movement of the carriage 28, the gauge rod 62 is shifted slightly axially before its collar 82 stops positively against the stop 80 and within this slight movement, the limit switch 4LS is actuated. Springs 89 within the sockets 83 restore the gauge rod 62 to normal position after the carriage begins its advance movement, the expansion of the springs 89 being limited by the contact of the overhanging flange plate 90 against the rear face of stop 80.

During the reciprocating motion of the carriage 28, the respective fixed vise 18 and movable vise 31 clamp and unclamp the workpiece alternately. While the carriage 28 is retracting, the workpiece is clamped in the fixed vise 18 and is held rigidly therein while the cutoff saw 17 severs the workpiece. At this time, the movable vise 31 is unclamped to permit the carriage 28 to move rearwardly along the table 26.

After the carriage 28 has completed its rearward movement and the cutoff saw has completed its cut and is lifted to an out-of-the-way position, movable vise 31 is automatically clamped on the workpiece and fixed vise 18 is unclamped therefrom. Accordingly, as the carriage 28 advances along the table 26, the workpiece will be advanced with respect to the cutoff saw 17 and the workpiece will slide freely between the jaws of the open vise 18. When the carriage 28 has completed its forward movement and abuts the positive stops 88, the jaws of fixed vise 18 will positively clamp the workpiece, the cutoff saw 17 will begin its sawing cut, movable vise 31 will release the workpiece and carriage 21 will begin another retrograde movement along the table 28.

As will appear from the detailed description of the circuit of FIG. 10, it is an important feature of the present invention that the respective vises 18, 31 are interlocked to insure that one vise or the other is always positively clamped upon the workpiece. Accordingly, there can be no unwanted movement or slippage of the workpiece with respect to the cutoff saw 17. Every saw cut will thus be made accurately and will produce cut off lengths of the workpiece which will exactly equal the length setting of the micrometer gauge shown in FIG. 8.

The disclosure of the details of the movable vise 31 shown in FIGS. 6 and 7 is representative also of the fixed vise 18. There is a fixed jaw at 32. A way 91 is provided along which the movable jaw 33 is slid for approximate spacing adjustment of jaw 33 with respect to the fixed jaw 32. The way 91 has a longitudinal slot 92 (FIG. 2) through which a rack 93 is exposed to a pawl 94 pivotally connected on pin 95 to the movable jaw 33.

Rack 93 is mounted for limited reciprocation longitudinally of the way 91 and is powered by the single acting fluid motor 36. The motor has a cylinder 102 and a piston 96 and a fluid line 97 for pressurizing the cylinder 102 from a hydraulic source 125 under control of valve 104. The piston 96 is returned on loss of pressure in the cylinder 102 under pressure of the return spring 98. The fluid motor 21 for the fixed vise 18 is similar. Fluid pressure is supplied thereto through line 99 as shown in FIG. 1.

The rough adjustment for the respective movable jaws of both vises 18, 31 is made by manually sliding the jaws along their ways and engaging the pawls 94 thereof with the appropriate tooth of the racks 93 when the jaw spacing is just slightly greater than the width of the workpiece. Thereafter, all manipulation of the movable vise jaws is power actuated by the respective fluid motors 21, 36 in the automatic cycle of the shuttle conveyor, which will now be described primarily in connection with FIG. 10.

Assume the start of the cycle with the movable vise 31 open and fully retracted toward the tail end of table 26, the saw frame 16 in its upper position and limit switch 6LS closed under pressure of its actuator finger 100 by reason of the elevation of the frame 16 to its topmost position. Accordingly, relay 4CR in circuit with limit switch 6LS is energized. Cycle start button 101 has been closed to energize relay CRA and all contactors connected thereto as indicated in FIG. 10 are actuated.

Energization of relay 4CR opens the normally closed contacts of the contactor 130 in circuit with the solenoid 103 of a solenoid-operated valve 104 in the fluid line 97 to the cylinder 102 of motor 36 for movable vise 31. This turns the valve 104 to admit hydraulic fluid to motor 36 from line 124 from source 125 and clamps the vise 31 on the workpiece 25. As back pressure builds up in the motor cylinder 102, a pressure switch 105 in line 97 is actuated. Normally open contacts 105a of said pressure switch 105 close to complete a circuit to the forward relay 60 for motor 42 to energize the forward contactors in the motor switch gear 59 and start the conveyor motor 42 in its forward direction to advance the carriage 28 forwardly along the table from its tail end towards its head end.

At the same time, the normally closed contacts 105b of the pressure switch 105 are opened to deenergize relay 1CR which was previously holding open the normally closed contacts of the contactor 108 in circuit with the solenoid 106 for the valve 107 in the line 99 to the fluid motor 21 for the fixed vise 18. The valve 107 is connected to line 99 in the same way as valve 104 is connected to line 97 as shown in FIG. 7. When solenoid 106 is thus energized, valve 107 will turn to block admission of hydraulic fluid into motor 21 and permit its spring similar to spring 98 of FIG. 7 to open vise 18. Accordingly, the carriage 28 is free to move forwardly with the workpiece 25 and fixed vise 18 is unclamped to permit such movement. Note that vise 18 did not open until vise 31 was closed and the pressure in the cylinder 102 of motor 36 had built up to a level sufficient to actuate the pressure switch 105. Accordingly, vise 18 is interlocked against opening until vise 31 is closed.

When the carriage 28 reaches its extreme forward position at the head end of table 26, it stops dead against the positive stops 88 and engages limit switch 2LS. Closure of limit switch 2LS energizes relay 1CR to open the normally closed contacts of the contactor 108 in circuit with the solenoid 106 of valve 107 and deenergizes the solenoid 106 and turns valve 107 back to its position in which it will admit fluid into motor 21 and clamp fixed vise 18 against the workpiece. As hydraulic pressure builds up in the pressure line 99 which supplies fluid to the motor 21, pressure operated switch 110 in line 99 will be actuated and its normally open contacts 110a will close to energize relay 2CR to close the normally open contacts of the contactor 109 in circuit with the solenoid 111 and open valve 112 which is in the fluid supply line 113 to one side of the double acting fluid motor 22 and energize the motor 22 in a direction to bring saw frame 16 down to start the saw cut in the workpiece 25. Concurrently the normally closed contacts in the contactor 116 in circuit with the conveyor motor forward relay 60 open to deenergize relay 60 and deenergize the conveyor motor 42.

Concurrently the normally open contacts of contactor 117 in circuit with the reversing relay 61 will close to energize conveyor motor sensing relay 61 to close appropriate contacts in switchgear 59 to operate motor 42 in reverse and to start the carriage 28 on its reverse stroke toward the tail end of table 26. Energization of the reverse relay 61 will concurrently open the normally closed contacts 113 in circuit with the relay 4CR to deenergize this relay.

Deenergization of relay 4CR will permit the normally closed contacts in contactor 130 in circuit with solenoid 103 for fluid valve 104 in line 97 to hydraulic motor 36 for vise 31 to open, thus turning valve 104 against admission of fluid into motor 36 and permitting spring 98 to unclamp vise 31 from the workpiece. Note that vise 31 will not release the workpiece until fluid pressure in motor 21 has built up to a level sufficient to actuate pressure switch 110. Accordingly, vise 31 is interlocked against opening until vise 18 is closed.

As the pressure drops in the fluid line 97, pressure switch 105 will open to permit reclosure of the normally closed contacts 105b thereof to maintain relay 1CR energized even after the conveyor moves far enough rearwardly to release the pressure from limit switch 2LS. The saw is now cutting the workpiece which is clamped in fixed vise 18 and the carrier 28 is on its reverse stroke with its vise 31 open.

At the end of its retrograde movement, carrier 28 opens normally closed limit switch 4LS, thus to deenergize the reverse relay 61 to deenergize the conveyor motor 42. Unless saw frame 16 has already reached its bottommost position, the conveyor motor 42 remains deenergized.

When the saw frame 16 reaches its bottommost position on the completion of the saw cut, normally open limit switch 5LS is actuated by finger 121. Limit switch 5LS is in circuit with a relay 3CR. Energization of relay 3CR opens the normally closed contacts of contactor 122 in circuit with the solenoid 111 of the valve 112 to open valve 112 to condition the motor 22 for its up stroke. Contacts in the normally open contactor 123 of relay 3CR are closed, thus to energize solenoid 114 for the valve 115 in fluid line 116 to the other side of double acting hydraulic cylinder 22 to lift the saw frame 16 to its uppermost position.

When the saw frame 16 reaches its uppermost position, limit switch 6LS is again engaged to initiate a new cycle of shuttle stroke workpiece feed as just described.

Accordingly, the machine will continue to cycle indefinitely as long as there is a workpiece 25 on the table 26. When it is desired to stop the cycle, the cycle stop button 118 is closed to deenergize relay CRA and actuate all contactors operated thereby.

What is claimed is:

1. The combination with a tool of a shuttle stroke conveyor for feeding workpieces to the tool in progressive increments, means for adjusting the stroke of the conveyor including gauge means for measuring the length of said stroke, a first positive stop to arrest conveyor movement at the end of its forward stroke, a second positive stop to arrest conveyor movement at the end of its rearward stroke and means to lock the workpiece against movement during said rearward stroke, said conveyor comprising an elongated feed table, a workpiece carrier movable longitudinally thereon and means for reciprocating said carrier along the table, said gauge means comprising a graduated rod extending along the table and with respect to which the carrier is movable, an adjustable stop on the rod having means for accurately fixing it to the rod, complementary stop means on the carrier, support bearings for said rod in which said rod is axially shiftable, said rod having a lost motion connection with said second positive stop, said means for reciprocating said carrier having control means including a switch, and means for actuating said switch in response to rod movement within the range of said lost motion connection.

2. The combination of claim 1 in which the means for reciprocating the carriage along the table comprises a chain, a motor in driving relation to the chain and a strain relief connection from the chain to the carrier to absorb the shock of arrestment of conveyor movement against said positive stops.

3. The combination with a tool and a fixed vise for holding a workpiece during tool operations thereon, of a shuttle stroke conveyor for feeding a workpiece to the tool in progressive increments, said conveyor comprising a movable carriage having a vise movable therewith, means for alternately clamping said vises on said workpiece to hold the workpiece in the fixed vise and release it from the movable vise during a tool operation and during the retractive stroke of the conveyor and to hold the workpiece in the movable vise and release it from the fixed vise between tool operations and during the advance stroke of the conveyor, said means including means to interlock said vises for positive clamping of the workpiece by one or the other of said vises at all times, the means for clamping said vises comprising fluid motors for the respective vises, said interlock means comprising means to release the pressure in the motor for one vise responsive to the buildup of fluid pressure in the motor for the other vise.

4. The device of claim 3 in which the means last mentioned comprises fluid pressure responsive switches subject to the pressure in the respective motors and valves in circuit with said switches for controlling flow of fluid to said motors.

References Cited by the Examiner
UNITED STATES PATENTS

| | | | |
|---|---|---|---|
| 1,382,623 | 6/21 | Byrne | 83—414 |
| 1,430,681 | 10/22 | Pierce | 83—390 |
| 1,478,676 | 12/23 | Richey | 104—176 |
| 1,840,684 | 1/32 | Welch | 83—375 |
| 1,863,005 | 6/32 | Campbell | 83—409 |
| 2,053,499 | 9/36 | Seybold et al. | 83—414 |
| 2,144,335 | 1/39 | Jensen et al. | 83—380 X |
| 2,491,901 | 12/49 | Moohl et al. | 226—162 X |
| 2,511,450 | 6/50 | Abbey | 226—141 |
| 2,610,688 | 9/52 | Overman | 83—314 X |
| 2,626,452 | 1/53 | Gridley | 226—141 X |
| 2,641,046 | 6/53 | Motch | 226—158 |
| 2,729,879 | 1/56 | Sampson | 83—282 |
| 2,781,093 | 2/57 | Rupp | 83—416 X |
| 3,113,767 | 12/63 | Halberstadt | 267—75 X |

ANDREW R. JUHASZ, *Primary Examiner.*

CARL W. TOMLIN, LEON PEAR, *Examiners.*